Patented Jan. 2, 1940

2,185,817

UNITED STATES PATENT OFFICE 2,185,817

SULPHONATED PRODUCTS

Ernst Alfred Mauersberger, Maarssen, Netherlands, assignor to Alframine Corporation, New York, N. Y., a corporation of New York No Drawing. Application March 1, 1939,
Serial No. 259,113

6 Claims. (Cl. 260—401)

My invention relates to improved sulphonated products, the method of manufacturing the same and their utilization for defined purposes.

The sulphonation products of my invention may be manufactured from condensation products which result from the reaction of chemical compounds having the general formula:

$$R.CO.(NH.C_xH_{2x})_n.OH$$

in which R represents any aliphatic chain having at least 7 carbon atoms and containing saturated, unsaturated or hydroxyl groups, $x$ represents a number from 2 to 5 and $n$ a number from 1 to 4, with aliphatic aldehydes. The reaction which occurs is expressed by the following equation:

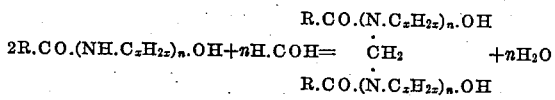

Sulphonation products made from the products of reaction between monoalkylolamines and fatty acids or fats are well known in the art. As compared with these prior art products, the products of the present invention have the advantage of greatly superior wetting power, foaming capacity, washing action, greater solubility in cold water of any degree of hardness and greater facility of sulphonation. The reaction products of the present invention may be easily sulphonated with an 85% sulphuric acid and the excess of sulphonating agent may be readily washed out with water without the use of Glauber's salt or any solvent.

The starting materials for the preparation of the products of the present invention are fatty acid alkylolamide bodies having the general formula given above and may be prepared by effecting a reaction between fatty acids or their esters and monoalkylolamines having the general formula:

$$NH_2.(C_xH_{2x}.NH)_n.C_xH_{2x}.OH$$

in which $x$ is a number from 2 to 5 and $n$ a number from 0 to 3.

Other reactions than that just described may be used in preparing the desired starting materials; for example, the fatty acids or their esters may first be converted by means of ammonia into the corresponding fatty acid amides and the latter then treated with alkylene oxides, chlorhydrines, etc., and possibly also with ammonia and polyethylenepolyamines. The method by which these starting materials are prepared is not germane to my invention and it is merely essential that the aliphatic chain R contain at least 7 carbon atoms. The chain may be saturated or unsaturated and may also contain a hydroxyl group, which would be the case if, for example, castor oil or its fatty acids were used.

Among the fats, oils and fatty acids which I may use are cocoanut oil, sperm oil, palm seed oil, cod liver oil, hardened cod liver oil, olive oil, castor oil, tea seed oil, etc., and their fatty acids. The selected substance is then caused to react with an aliphatic aldehyde containing 1 to 5 carbon atoms in the molecule.

I may use the aldehydes in concentrated form but inasmuch as by doing so a relatively strong heat of reaction is developed it is generally preferable to use the aldehydes in aqueous solution. The reaction temperature fluctuates in accordance with the concentration of the aldehyde solution, the length of the chain and the number of NH groups in the molecule, and generally varies between room temperature and 150° C., and in the latter case it is desirable to carry out the reaction in an autoclave.

The aldehyde is preferably used in excess, which may be distilled off and recovered upon completion of the reaction. Should the starting material contain a number of NH groups, the reaction may be performed so that only one single NH group of a molecule enters into reaction. In the latter case the reaction mostly occurs directly at relatively low temperature, while in the case of a plurality of NH groups higher temperatures are required.

Upon completion of the reaction, which is usually within about two hours, the reaction product is heated to about 140° C., to distill off the added water, the water of reaction and the excess aldehyde, and this temperature is maintained until nothing more distills over. I may, if desired, use vacuum at this temperature to drive off the last dissolved residues of aldehyde, although this is not essential.

The equation set out earlier in this specification illustrates the course of the reaction when formaldehyde is used, and the following equation indicates the reaction when acetaldehyde is used:

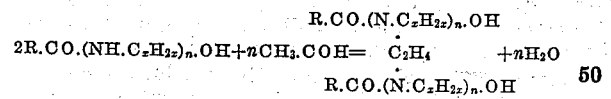

I may use a variety of aldehydes, among them being formaldehyde, acetaldehyde, propylaldehyde, butyaldehyde, crotonaldehyde, etc., containing up to 5 carbon atoms in the molecule.

The condensation products, freed of water, are distinguished by a very low melting point in comparison with that of the starting material, and an emulsifiability for water and oils.

The sulphonating step may be performed with an 85% sulphuric acid, and is governed to a certain extent by the number of the unsaturated bonds and hydroxyl groups and the melting point. The concentration of the sulphonating agent may be higher than 85% and the operation may even be carried out with oleum or fuming sulphuric acid. In sulphonating solid condensates it is desirable to introduce the condensate into the sulphuric acid.

Sulphonation is completed as soon as the sulphonation product is soluble in cold water. It is generally desirable to use an excess of sulphuric acid in the sulphonation procedure. When sulphonation is completed, the excess sulphuric acid is removed by running the acid sulphonation product into ice water, thus forming two layers and causing the excess sulphonating agent to dissolve in the washing water. After the excess sulphonating agent has been washed out the resulting sulphonate is neutralized.

According to the type of starting material used, the neutralization products are either liquid sulphonates or pastes which may be dried to powder form. All these sulphonates are distinguished by high washing, wetting and foaming action, great resistance to acids and alkalies and absolute resistance to hard water and magnesium salts.

The products of my invention may be used as foaming agents in foam fire extinguishers, as textile auxiliaries, as washing agents for household purposes in regions where hard water is used and as shampoos. The unneutralized acid sulphonates are also excellently adapted for breaking oil emulsions of fatty acids and fats, such as mineral oils (raw petroleum).

The following examples will serve to illustrate, without limiting, my invention:

*Example 1*

500 gr. of a condensation product having a melting point of 46° C., and an acetyl number of 239, and which was produced by heating 100 parts of castor oil and 20 parts of monoethanolamine for two hours up to 230° C., are placed with 170 ccm. of a 30% formaldehyde solution into an autoclave where they are heated for one hour up to 130° C., and stirred throughout the heating time. The solution is then cooled, whereby the excess of formaldehyde solution which did not enter into reaction separates and may be used in the succeeding reaction. The reaction mixture is then heated to 140° C., with constant stirring, thus distilling over any formaldehyde still in solution, together with some water, the formaldehyde being recoverable. The contents of the autoclave are again cooled producing a soft mass having a melting point of about 22° C., and an acetyl number of 291. This mass, after standing for a considerable time takes on the consistency of butter, is pure white in color and odorless.

150 gr. of the above reaction product are slowly introduced into 100 ccm. of a 92% sulphuric acid and sulphonation is effected at temperatures around 40° C. As soon as all the reaction product has gone into solution, stirring is continued for about one-half hour and the product then cooled. This product is a reddish brown oil which is clearly soluble in water. This oil is then decanted into 280 ccm. of ice water, with constant stirring, and the mass allowed to stand quiescent for two hours. Two layers form immediately. After the two hour period, the separated dilute sulphuric acid is drawn off and the remaining acid sulphonate is neutralized at about 20 to 25° C., with a 30 Bé. caustic soda solution. The neutralization product is a light yellow oil which, upon cooling to about 15° C., still separates off some Glauber's salt.

This neutral oil, which is about 38%, has an excellent foaming action and a good wetting and washing action. To prepare a good shampoo therefrom, the oil is diluted with water until it has a concentration of 25%, thereupon enough lactic acid is added until the pH value is about 4.8 and any desired perfume introduced.

*Example 2*

500 gr. of a condensation product, which was produced by heating 100 parts of cocoanut oil and 27 parts of monoethanolamine to 200° C., are introduced into a closed boiler together with 150 ccm. of a 35% formaldehyde solution, the mixture stirred and slowly heated to 90° C., maintained at this temperature for about two hours, whereupon water and excess formaldehyde are distilled off. The resulting reaction product is a soft, wax-like mass, having a melting point of 38° C., and the formula of which is:

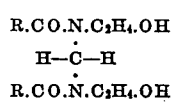

in which R represents the aliphatic chain of the cocoanut fatty acid.

To sulphonate this reaction product, 150 gr. thereof in molten condition are run into 150 ccm. of an 85% sulphuric acid, with constant stirring, and the sulphonating temperature maintained at about 45° C. Thereupon the boiler contents are cooled down to 25° C., and an additional 50 ccm. of a 96% sulphuric acid are added thereto. After about 10 minutes stirring or agitation, this acid sulphonate is run into 500 ccm. of ice water, the whole allowed to settle for one and one-half hours, whereupon 510 ccm. of a dilute sulphuric acid are drawn off. The residual sulphonate is then neutralized at 20 to 25° C., with 210 ccm. of a 30 Bé. caustic soda solution. The resulting product, which is about 25%, is a pure white paste, clearly soluble in cold water and having an extraordinarily high foaming and wetting capability. It is usable for textile purposes.

*Example 3*

500 parts by weight of the starting material of Example 1 and 50 parts by weight of an 80% acetaldehyde are slowly heated to 70° C., in an agitating boiler and held at this temperature for about one hour. The whole is then rapidly heated to 140° C., to distill off the excess aldehyde with the water. The resulting reaction product is light red in color, has a melting point of 31° C., is emulsifiable with water, and the formula thereof is:

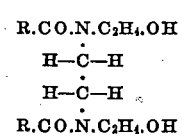

in which R represents the chains of the castor oil fatty acids.

150 gr. of this condensate are introduced into 100 ccm. of a 95% sulphuric acid and the mixture stirred until the pieces are dissolved, whereupon the whole is cooled down to 25° C., and this sulphonate is decanted into 500 ccm. of ice water. When all the sulphonate has been stirred in, the product is allowed to stand until clear, whereupon the separated dilute sulphuric acid is drawn off and the remaining sulphonate is neutralized at 20 to 25° C., with a 30 Bé. caustic soda solution. The resulting sulphonate is a golden yellow oil, having excellent foaming properties and usable for textile purposes as well as, primarily, for foam fire extinguishers.

*Example 4*

500 gr. of a condensation product obtained by heating 300 parts by weight of fatty acids of olive oil and 95 parts by weight of monoisobutanolamine to 200° C., are introduced together with 60 parts by weight of a 33% formaldehyde solution into a pressure boiler, are therein constantly stirred and heated to 120° C., at which the boiler contents are maintained for about two hours. At the end of this period the formaldehyde has completely entered into reaction, the water of reaction is distilled off and there remains a light yellow, readily water emulsifiable oil, which hardens slowly in the cold and the formula of which is:

R.CO.N.C₄H₈.OH
H—C—H
R.CO.N.C₄H₈.OH

This product is sulphonated in a manner analogous to that described in Example 1 and produces a semi-fluid light yellow paste.

*Example 5*

300 gr. of castor oil fatty acids and 100 gr. of hydroxyethylethylenediamine are heated to 200° C., to effect conversion into the corresponding amide having the following structural formula:

R.CO.NH.C₂H₄.NH.C₂H₄.OH

The resulting amide has a melting point of about 30° C., only hardens below 20° C., and is white in color. This amide together with 200 ccm. of a 34% formaldehyde solution are heated to 135° C., in an autoclave. After two hours the solution is cooled, an aqueous layer of a dilute formaldehyde solution separates and this is removed. Thereupon the remaining golden yellow oil is heated to 140° C., in order to drive off any dissolved aldehyde contained therein. After cooling, a golden yellow oil remains which stays fluid at even 5° C.

The reaction product probably consists of a mixture of the two following bodies:

R.CO.N.C₂H₄.NH.C₂H₄.OH    R.CO.N.C₂H₄.N.C₂H₄.OH
    CH₂                and      CH₂    CH₂
R.CO.N.C₂H₄.NH.C₂H₄.OH    R.CO.N.C₂H₄.N.C₂H₄.OH To effect sulphonation of this reaction product, 200 gr. thereof are run into 150 ccm. of an 85% sulphuric acid and the temperature is held between 35 and 45° C. Thereupon an additional 50 ccm. of a 95% sulphuric acid are introduced and the whole cooled, with stirring, to about 20° C. Then the sulphonation product is run into 400 ccm. of ice water, well stirred, and allowed to clarify. After standing for two hours the liquid has separated into two layers, the lower of which consists of dilute sulphuric acid and is drawn off. Then the upper layer, which is the acid sulphonate, is neutralized at 20 to 25° C., with a 30 Bé. caustic soda solution, yielding a viscid oil which has excellent foaming and wetting properties.

I claim:
1. The herein described process of producing chemical compounds, which comprises reacting at elevated temperatures aliphatic aldehydes containing 1 to 5 carbon atoms in the molecule, with compounds having the general formula:

R.CO.(NH.C$_x$H$_{2x}$)$_n$.OH in which R represents any alkyl or hydroxy-substituted alkyl chain of a fatty acid containing at least seven carbon atoms, $x$ represents a number from 2 to 5 inclusive and $n$ represents a number from 1 to 4 inclusive, and sulphonating the resulting product.

2. The process of claim 1, including the additional step of removing the excess aldehyde and water of reaction from the unsulphonated product.

3. The process of claim 1, including the step of neutralizing the sulphonated product.

4. The process of claim 1, including the additional steps of removing the excess aldehyde and water of reaction from the unsulphonated product and neutralizing the sulphonated product.

5. As a new compound, the sulphonation product of the reaction product of an aliphatic aldehyde containing 1 to 5 carbon atoms with a compound having the general formula:

R.CO.(NH.C$_x$H$_{2x}$)$_n$.OH in which R represents any alkyl or hydroxy-substituted alkyl chain of a fatty acid containing at least seven carbon atoms, $x$ represents a number from 2 to 5 inclusive and $n$ represents a number from 1 to 4 inclusive.

6. As a new compound, the neutralized product of claim 5.

ERNST ALFRED MAUERSBERGER.